United States Patent [19]

Yang et al.

[11] Patent Number: 5,568,457
[45] Date of Patent: Oct. 22, 1996

[54] OPTICAL PICKUP SYSTEM FOR READING OR WRITING INFORMATION ON DISK USING HOLOGRAM DEVICE AND WOLLASTON PRISM

[75] Inventors: Keun Y. Yang, Kyungki-do; Sung W. Noh, Seoul, both of Rep. of Korea

[73] Assignee: LG Electronics Inc., Seoul, Rep. of Korea

[21] Appl. No.: 393,838

[22] Filed: Feb. 24, 1995

[30] Foreign Application Priority Data

Feb. 26, 1994 [KR]   Rep. of Korea .................... 3608/1994

[51] Int. Cl.$^6$ .................................................. G11B 7/095
[52] U.S. Cl. .................... 369/44.23; 369/44.42; 369/110; 369/112
[58] Field of Search .................. 369/44.23, 44.41–44.42, 369/54, 110, 112

[56] References Cited

U.S. PATENT DOCUMENTS

5,189,655   2/1993   Ogata et al. ..................... 369/44.23
5,483,509   1/1996   Yang et al. ..................... 369/44.23

Primary Examiner—W. R. Young
Attorney, Agent, or Firm—John P. White

[57] ABSTRACT

An optical pickup system simply formed to improve readout speed and reduce manufacturing cost having a semiconductor laser light source, a polarizing beam splitter (PBS), a collimator lens for changing the laser beam into parallel beams, a reflection mirror, an objective lens, a photodetector divided-by-six for detecting tracking and focus errors, a hologram device, a bisectional photodetector, a Wollaston prism for separating a beam into P-wave and S-wave components from a mixed beam of P-wave and S-wave components from the PBS, and a focusing lens for focusing the P-wave and S-wave component beams separated by the Wollaston prism onto two sections of the bisectional photodetector.

11 Claims, 5 Drawing Sheets

OPTICAL PICKUP SYSTEM FOR READING OR WRITING INFORMATION ON DISK USING HOLOGRAM DEVICE AND WOLLASTON PRISM

BACKGROUND OF THE INVENTION

1. Field of the Invention

The present invention relates to an optical pickup system for writing/reading out information on/from a magneto-optical disc, and more particularly to an optical pickup system having a simplified structure capable of improving read-out speed and reducing manufacturing cost.

2. Description of the Prior Art

Figure 1:
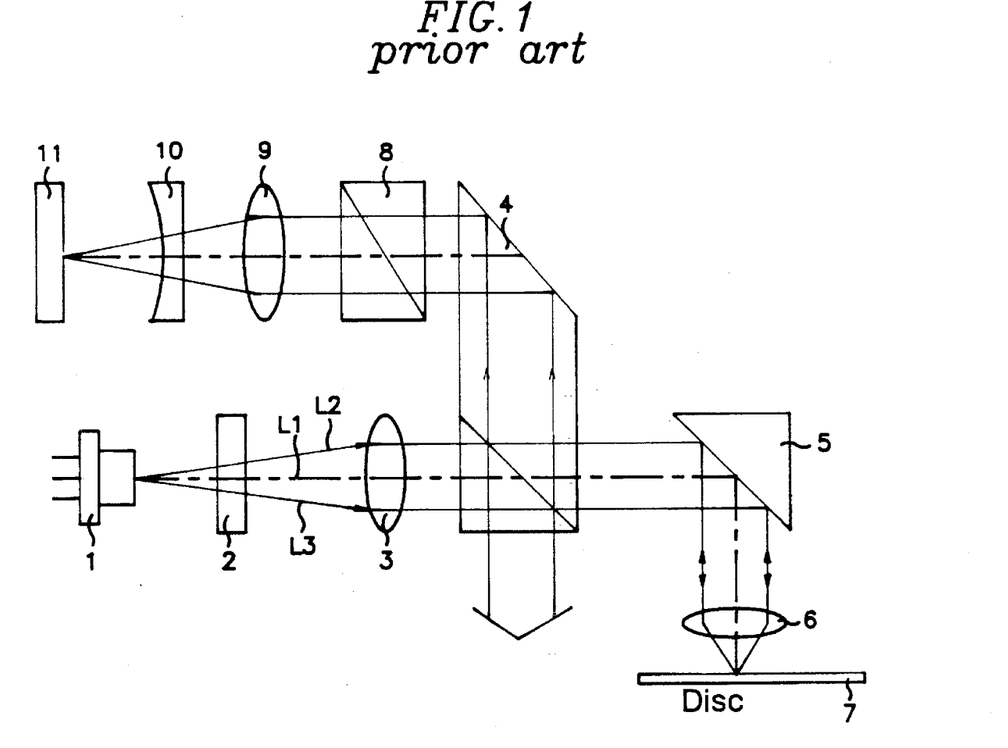
FIG. 1 is a construction view showing a conventional optical pickup system.

FIG. 1 illustrates a construction of a conventional optical pickup system.

Referring to FIG. 1, the optical pickup system includes an optical disc 7, a semiconductor laser 1 used as a light source, and a diffraction grating 2 for forcing laser beam from the semiconductor laser 1 to be one main beam and two sub-beams for detecting a tracking error of the disc 7. A collimator lens 3 allows the three beams passed through the diffraction grating 2 to be parallel beams. With respect to the parallel beams having passed through the collimator lens 3 or beams reflected by the optical disc 7, all S-polarized wave and some P-polarized wave are reflected by a polarizing beam splitter (hereinafter simply referred to as "PBS") 4 which transmits the other P-polarized wave. Also, a reflection mirror 5 reflects P-polarized three beams L1, L2 and L3 passed through the PBS 4 toward optical disc 7, and an objective lens 6 focuses the P-polarized three beams L1, L2 and L3 reflected by the reflection mirror 5 onto the disc 7 or forces three beams L1, L2 and L3 respectively mixed with P-wave and S-wave reflected by the disc 7 to be parallel beams. In addition to these, the optical pickup system includes a modified Wollaston prism 8 which separates the parallel beams mixed with the P-wave and S-wave incident from the disc 7 via the PBS 4 into P-wave, S-wave and (P+S)-wave for the purpose of separating the incident three beams into five beams, an image-forming lens 9 for imaging the five beams separated via the Wollaston prism 8, a concave lens 10, and a photodetector 11 divided-by-eight.

Figure 2:
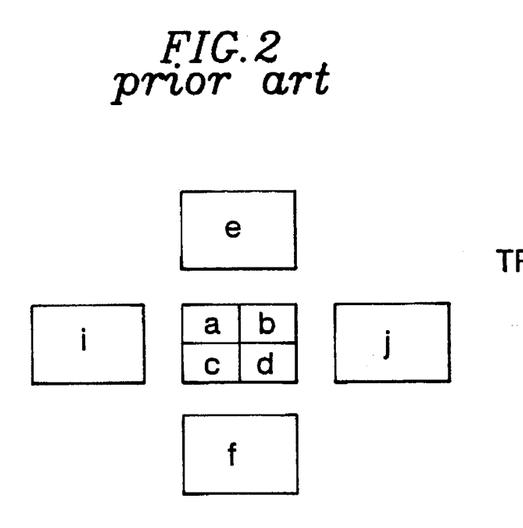
FIG. 2 shows a structure of the photodetector divided-by-eight for forming the optical pickup system of FIG. 1.

The concave lens 10 has a toric surface which induces astigmatism to the main beam having passed through the image-forming lens 9 in order to detect a focus error. The photodetector 11 divided-by-eight is constructed as shown in FIG. 2, in which sections a, b, c and d in the center of the divided-eight area are for focusing the beam of (S+P)-wave component separated from the main beam incident from the concave lens 10, so that the focus error is monitored by a signal detected in the sections a, b, c and d. Reference symbols e and f on the upper and lower portions of the sections a, b, c and d designate sections for focusing the beam of P-wave and S-wave components respectively separated from the sub-beams, so that the tracking error is monitored by means of a signal difference detected in the sections e and f. Sections i and j on the left and right portions of the sections a, b, c and d are for focusing the beam of S-wave and P-wave components separated from the main beam, so that the existence of information on the disc 7 is determined by means of a signal detected in the sections i and j.

In the conventional optical pickup system, the beam radiated from the semiconductor laser 1 is transformed into one main beam L1 and two sub-beams L2 and L3 via the diffraction grating 2, and S-wave of the three beams passed through the diffraction grating 2 is reflected to allow only the P-wave to advance toward the disc 7 via the collimator lens 3, PBS 4, reflection mirror 5 and objective lens 6, sequentially. Furthermore, the three beams L1 to L3 reflected by the disc 7, which respectively mixed with P-wave and S-wave, are incident to the Wollaston prism 8 via the objective lens 6, reflection mirror 5 and PBS 4, and then separated into P-wave, S-wave and (P+S)-wave via the Wollaston prism 8. Thus, the separated beams are supplied to the photodetector 11 via the concave lens 10.

The operation of the foregoing optical pickup system will be described in detail with reference to FIGS. 2 to 6.

The laser beam emitted from the semiconductor laser 1 being the light source is diffracted into one main beam L1 and two sub-beams L2 and L3 via the diffraction grating 2, and the main beam L1 and sub-beams L2 and L3 are changed into the parallel beams by the collimator lens 3 to be incident to the PBS 4. With respect to the three beams L1 to L3, the PBS 4 reflects 100% of S-wave and 50% of P-wave, and transmits the other 50% of P-wave. In other words, because the S-wave is fully reflected and P-wave is partially reflected by the PBS 4, just three beams L1 to L3 that are P-polarized via the PBS 4 are transmitted to be incident to the reflection mirror 5 which then reflects the incident three beams toward the disc 7. The reflected beams are focusing onto the disc 7 through the objective lens 6.

Figure 3:
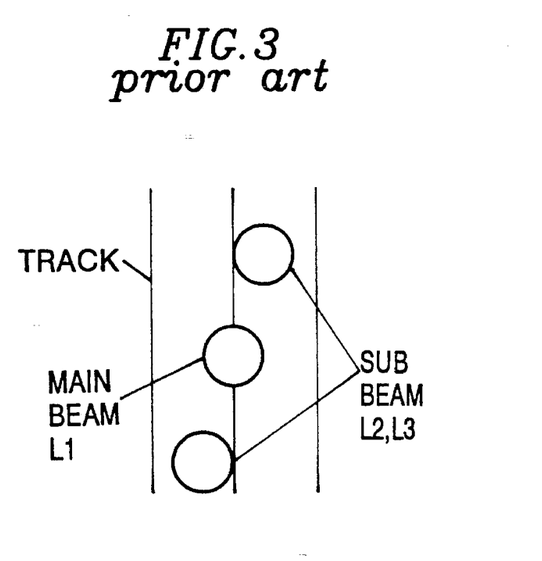
FIG. 3 represents the focusing pattern of three beams on the disc in the optical pickup system shown in FIG. 1.

The three beams L1 to L3 are focusing onto the disc 7 by means of the objective lens 6 as shown in FIG. 3, in which the main beam L1 is utilized for reading out information and detecting the focus error, and two sub-beams L2 and L3 are utilized for detecting the tracking error. The three beams are reflected from the disc 7 with holding both information (i.e., pit information or kerr rotation by a magnetization direction) written on the disc 7 and information required for detecting the tracking error.

At this time, only the P-polarized beam is focusing onto the disc 7, but the parallel beams reflected from the disc 7 differ in view of the information whether the information is written on the disc 7 or not. In more detail, when the information is not written on the disc 7, the parallel beams reflected from the disc 7 include only the P-wave component without containing the S-wave component. Whereas, the parallel beams from the disc 7 are mixed beams having S-wave and P-wave components when the information is written on the disc 7. The parallel beams reflected from the disc 7 via the objective lens 6 is reflected by the reflection mirror 6 to be incident to the PBS 4 which, with respect to the incident parallel beams, reflects all S-wave and 50% of the P-wave, and transmits the other 50% of the P-wave. Therefore, of the parallel beams reflected by the disc 7, the S-wave component is fully reflected through the PBS 4 to be incident to the Wollaston prism 8, and the P-wave component is transmitted and reflected in halves via the PBS 4 to be incident to the Wollaston prism 8.

Figure 4:
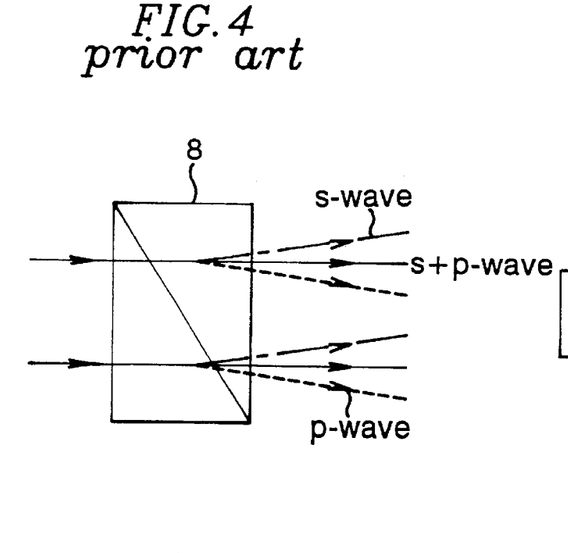
FIG. 4 is a view for illustrating the S-wave and P-wave separated from the main beam via the modified Wollaston prism shown in FIG. 1.

As shown in FIG. 4, the Wallaston prism 8 separates the main beam into three beams by separating the main beam L1 in the parallel beams incident via the PBS 4 into the S-wave, P-wave and (P+S)-wave, and separates the sub-beams L2 and L3 into the P-wave and S-wave, respectively. By this operation, the parallel beams incident from the PBS 4 are separated into five beams through the Wollaston prism 8 to be incident to the concave lens 10 via the image-forming lens 9.

Figure 5:
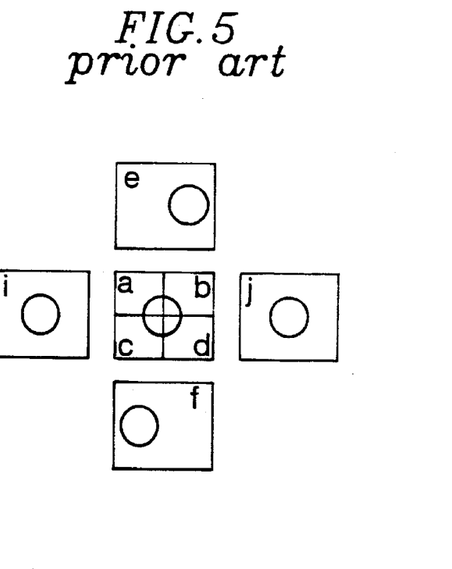
FIG. 5 represents the focusing pattern of five beams on the photodetector divided-by-eight shown in FIG. 1.

The concave lens 10 having the toric surface to induce astigmatism increases an angle between five beams incident from the image-forming lens 9 while producing the astigmatism in the main beam to detect the focus error. The five beams passed through the concave lens 10 are focusing into the photodetector 11 divided-by-eight as shown in FIG. 5.

The tracking error and focus error as well as the information written on the disc 7 are monitored in accordance with the shapes of the five beams focusing onto respective sections of the photodetector 11 divided-by-eight.

Here, the tracking error by means of the sub-beams is monitored as defined in equation (1), in which the signal difference of the sections e and f of the photodetector 11 divided-by-eight is detected as a tracking error signal TES, using a three-beam monitoring method:

$$TES=Se-Sf \quad (1)$$

where Se and Sf denote signals in the sections e and f of the photodetector 11 divided-by-eight.

Figure 6A:
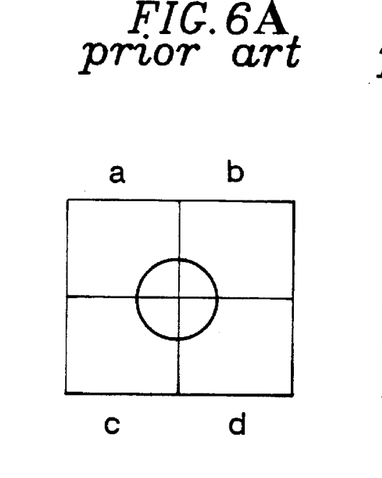
Figure 6B:
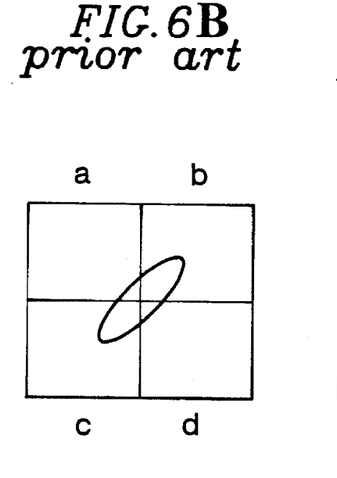
Figure 6C:
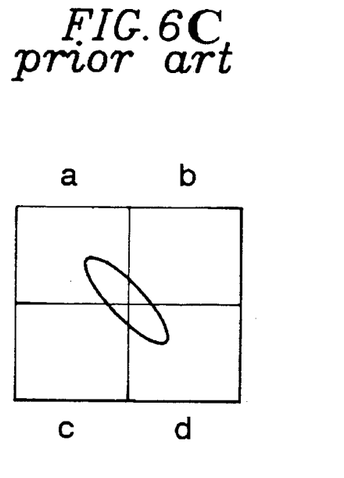

As illustrated in FIG. 6, along with differing a distance between the disc 7 and objective lens 6, the beam that is focusing onto the sections a, b, c and d of the photodetector 11 divided-by-eight is varied. At this time, FIG. 6A illustrates the focusing pattern of the beam in the sections a, b, c and d when the objective lens 6 and disc 7 are reasonably distanced not to cause the focus error, FIG. 6B is the focusing pattern of the beam in the sections a, b, c and d when the objective lens 6 is distant from the disc 7 to cause the focus error, and FIG. 6C is the focusing pattern of the beam in the sections a, b, c and d when the objective lens 6 is near to the disc 7 to cause the focus error.

A focus error signal is monitored by the signal difference according to the variation of the beams in the sections a, b, c and d, which is expressed by the following equation (2):

$$FES=(Sa+Sc)-(Sb+Sd) \quad (2)$$

where, FES designates the focus error signal, Sa, Sc, Sb and Sd are signals in the sections a, c, b, and d of the photodetector 11 divided-by-eight, respectively.

As can be noted in equations (1) and (2), if there is no tracking error and focus error, the tracking error signal TES becomes zero and the focus error signal FES becomes zero, too.

The information written on the disc 7 can be monitored by the beam that is focusing onto the sections i and j of the photodetector 11 divided-by-eight by meas of the S-wave and P-wave components separated from the main beam. When the magneto-optical signal (kerr rotation by the magnetization direction) is read out, the information is monitored by a difference between signals Si and Sj in the sections i and j, as is defined in equation (3) below:

$$\text{Optical information signal (magneto-optical signal)} = Si-Sj \quad (3)$$

On the other hand, the pit signal of uneven shape written on the disc 7 is monitored by the variation of light quantity in the sections i and j of the photodetector 11 divided-by-eight as below:

$$\text{Optical information signal (pit signal)} = Si+Sj \quad (4)$$

However, the conventional optical pickup system heretofore has the following drawbacks.

That is, the diffraction grating for forming the sub-beams from the laser beam of the semiconductor laser must be employed to monitor the tracking error by means of the three beams. Moreover, the astigmatism is utilized for detecting the focus error by the three beams to require the toric concave lens that is difficult to be fabricated and is expensive. In addition to the concave lens, the Wollaston prism which is also difficult to be fabricated is used for separating the mixed beam having the P-wave and S-wave for detecting the focus error from the main beam reflected by the disc.

Furthermore, for allowing the beam emitted from the semiconductor laser to be partially incident to the disc or the beam reflected by the disc to be partially incident to the Wollaston prism, the pentagonal PBS which leads to fastidious fabrication is fastidious is used.

Briefly, in the conventional optical pickup system, so many optical parts are used for reading out information written on the magneto-optical disc, which incur high expense and are difficult to be fabricated. Thus, the structure of the optical pickup system is complicated while increasing the manufacturing cost. Additionally, the great number of optical parts increases the inherent weight of the optical pickup system to lengthen access time for reading out the information written on the disc, resulting in lowering the information read-out speed.

SUMMARY OF THE INVENTION

It is an object of the present invention to provide an optical pickup system capable of writing/reading out information on/from a disc by means of a single-beam system, using a bisectional hologram.

It is another object of the present invention to provide an optical pickup system for improving read-out speed of information written on a disc by decreasing the number of optical parts.

It is still another object of the present invention to provide an optical pickup system having a simplified structure for reducing manufacturing cost.

To achieve the above object of the present invention, there is provided an optical pickup system capable of reading out information from a disc or writing information on the disc including a semiconductor laser used as a light source. In the optical pickup system, a polarizing beam splitter fully reflects all S-polarized beam, reflects some of P-polarized beam and transmits the other P-polarized beam with respect to the laser beam from the semiconductor laser, while fully reflecting all S-polarized beam, reflecting some of P-polarized beam and transmitting the other P-polarized beam with respect to beams reflected by the disc. A collimator lens placed between the semiconductor laser and polarizing beam splitter changes the laser beam from the semiconductor laser to be parallel beams to allow the parallel beams to be incident to the polarizing beam splitter, and focuses the P-polarized beam transmitted through the polarizing beam splitter prior to being reflected by the disc. Also, a reflection mirror placed between the polarizing beam splitter and disc reflects the beams transmitting through the polarizing beam splitter toward the disc, and reflects the beams reflected by the disc toward the polarizing beam splitter. An objective lens placed between the reflection mirror and disc focuses the beams reflected by the reflection mirror onto the disc, and forms the beams reflected by the disc to be parallel beams to allow the parallel beams to be incident to the reflection mirror. In addition to these, a photodetector divided-by-six detects a tracking error and a focus error in accordance with the intensity of beams respectively focusing onto six sections thereof, and a hologram device placed between the semiconductor laser and collimator lens diffracts to allow the laser beam from the semiconductor laser to be incident to the collimator lens, and diffracts to focus the P-polarized beam transmitted through the polarizing beam splitter onto the photodetector divided-by-six. A bisectional photodetector detects the information written on the disc in accordance with the intensity of the beams respectively focusing onto two sections thereof, and a Wollaston prism placed between the polarizing beam splitter and bisectional photodetector separates beams of P-wave component and S-wave component from a mixed beam of having P-wave and S-wave components from the polarizing beam splitter. Furthermore, the optical pickup system has a focusing lens for focusing the P-wave and S-wave separated by means of the Wollaston prism onto two sections of the bisectional photodetector.

BRIEF DESCRIPTION OF THE DRAWINGS

The above objects and other advantages of the present invention will become more apparent by describing in detail preferred embodiments thereof with reference to the attached drawings in which:

FIGS. 6A–6C illustrate the focusing pattern of the beam onto the photodetector resulting from the change of the distance between the optical disc and objective lens in the optical pickup system shown in FIG. 1, wherein FIG. 6A shows the focusing state of the beam without involving the focus error, and FIGS. 6B and 6C show the focusing states of the beam which involves the focus error;

FIG. 11A–11C illustrates the focusing pattern of the laser beam onto the photodetector divided-by-six resulting from the change of the distance between the optical disc and objective lens in the optical pickup system according to the present invention, wherein FIG. 11A shows the focusing state of the beam without involving the focus error, FIG. 11B shows the focusing state of the beam when the disc is near to the objective lens, and FIG. 11C shows the focusing state of the beam when the disc is distant from the objective lens.

DETAILED DESCRIPTION OF THE PREFERRED EMBODIMENTS

Figure 7:
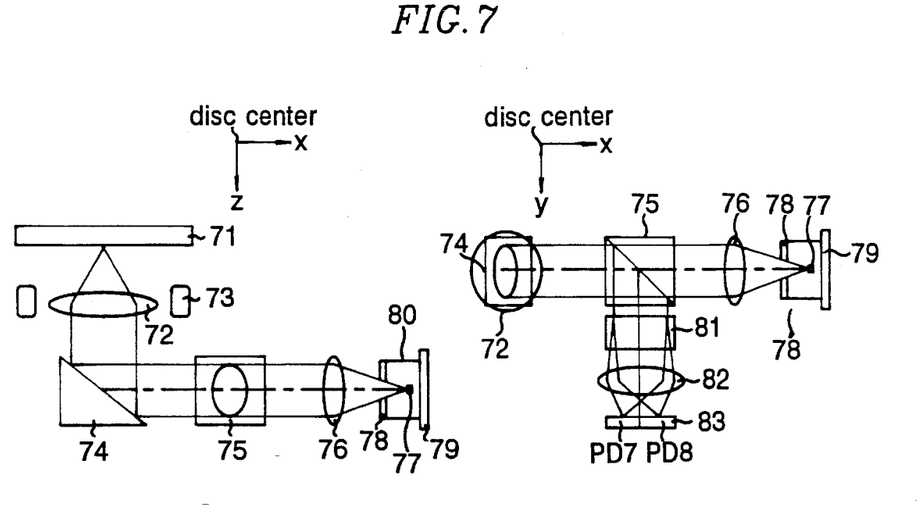
FIG. 7 is a construction view showing an optical pickup system according to the present invention.

FIG. 7 illustrates a construction of an optical pickup system according to the present invention, in which FIG. 7A is a view shown in the x-z direction at the starting point of a disc, and FIG. 7B is a view shown in the x-y direction at the starting point of the disc. Here, the direction x-z or x-y adopts the center of the disc as the starting point.

Referring to FIG. 7, the optical pickup system according to the present invention includes a disc 71, an objective lens 72, an actuator 73, a reflection mirror 74, a polarizing beam splitter 75, a collimator lens 76, a semiconductor laser 77 used as a light source, a bisectional hologram device 78, a hologram laser unit 80 formed of photodetector 79 divided-by-six, a Wollaston prism 81, a focusing lens 82 and a bisectional photodetector 83.

The collimator lens 76 is disposed on the preceding position of the hologram laser unit 80 to force the laser beam of the semiconductor laser 77 diffracted by the bisectional hologram device 78 to be parallel beams or to force P-polarized beam transmitted through the polarizing beam splitter 75 to be incident to the two-split holograph device 78.

The polarizing beam splitter 75 is placed between the reflection mirror 74 and collimator lens 76 in the x-z direction to, with respect to the parallel beams passed through the collimator lens 76, fully reflect the beam of S-wave component, and reflect some of the P-polarized beam to the reflection mirror 74 while transmitting the other P-polarized beam. At the same time, of the parallel beams reflected by the optical disc 71, the polarizing beam splitter 75 functions by reflecting 100% of the S-polarized beam and some of the P-polarized beam, and transmitting the other of the P-polarized beam to be incident to the reflection mirror 74. Furthermore, the polarizing beam splitter 75 is disposed between the reflection mirror 74 and Wallaston prism 81 in the x-y direction to, with respect to the parallel beams incident from the disc 71 via the reflection mirror 74, fully reflect 100% of the S-polarized beam to the Wallaston prism 81, transmit some (50%) of the P-polarized beam, and reflect the other (50%) of the P-polarized beam to the Wallaston prism 81.

The reflection mirror 74 placed between the polarizing beam splitter 75 and objective lens 72 reflects the P-polarized beam passed through the polarizing beam splitter 75 toward the disc 71 via the objective lens 72, and reflects the beam reflected from the disc 71 via the objective lens 72 to the polarizing beam splitter 75. Here, the beam reflected toward the disc 71 from the reflection mirror 74 denotes the beam containing the P-wave component only, and the beam reflected from the disc 71 toward the polarizing beam splitter 75 is the mixed beam that has the P-wave together with S-wave in accordance with the existence of information on the disc 71.

The objective lens 72 is positioned between the reflection mirror 74 and disc 71 to focus the parallel beams reflected by the reflection mirror 74 onto the disc 71, and make the beam reflected from the disc 71 be the parallel beams to be incident to the reflection mirror 74.

The Wallaston prism 81 disposed between the polarizing beam splitter 75 and focusing lens 82 separates the beam of P-wave component and the beam of S-wave component from the mixed beam of having S-wave and P-wave incident from the polarizing beam splitter 75 to permit the separated beams to be incident to the focusing lens 82. At this time, the beams of P-wave component and S-wave component are separated while maintaining a certain angle with each other.

In the conventional optical pickup system, the S-wave, P-wave and (P+S)-wave are separated by means of the modified Wollaston prism, but only the S-wave and P-wave are separated by means of the general Wollaston prism in the present invention.

The focusing lens 82 is placed between the Wollaston prism 81 and bisectional photodetector 83 for focusing the beams of S-wave component and P-wave component separated via the Wollaston prism 81 onto the bisectional photodetector 83. The bisectional photodetector 83 disposed on the succeeding position of the focusing lens 82 is for focusing the beams of S-wave component and P-wave component incident from the Wollaston prism 81 via the focusing lens 82, and monitors the beam focusing onto the bisectional photodetector 83 to detect the information written on the disc 71.

The hologram laser unit 80 which is formed of the semiconductor laser 77 used as the light source, bisectional hologram device 78, and photodetector 79 divided-by-six is placed on the preceding position of the collimator lens 76.

The semiconductor laser 77 is formed in such a manner that an active layer thereof is parallel to the x-y plane in order to allow the laser beam from the semiconductor laser 77 to be P-polarized when the laser beam is incident to the polarizing beam splitter 75.

The bisectional hologram device 78 diffracts to make the beam emitted from the semiconductor laser 77 be incident to the collimator lens 76, or diffracts the beam focusing onto the disc 71 via the collimator lens 76 and then P-polarized from the disc 71 to induce astigmatism. The photodetector 79 divided-by-six accepts the beam being diffracted by means of the bisectional hologram device 78 prior to being focused, so that an error signal is detected, using the beam focused by the photodetector 79 divided-by-six.

Figure 8:
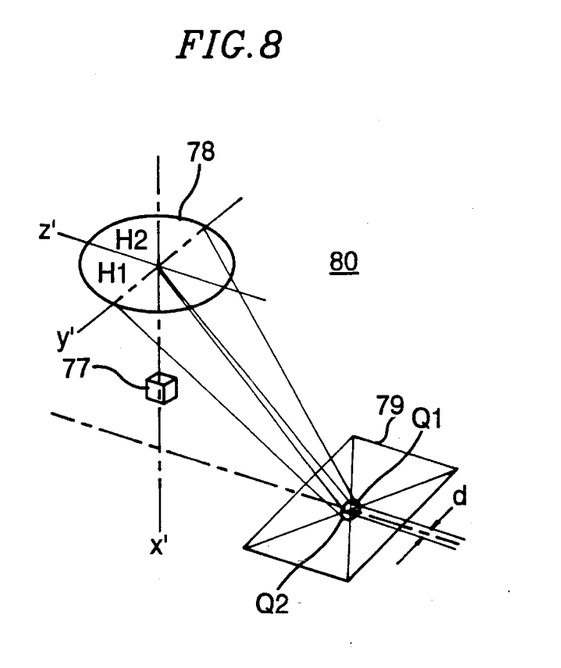
FIG. 8 is a construction view showing a hologram laser unit for forming the optical pickup system according to the present invention.
Figure 9:
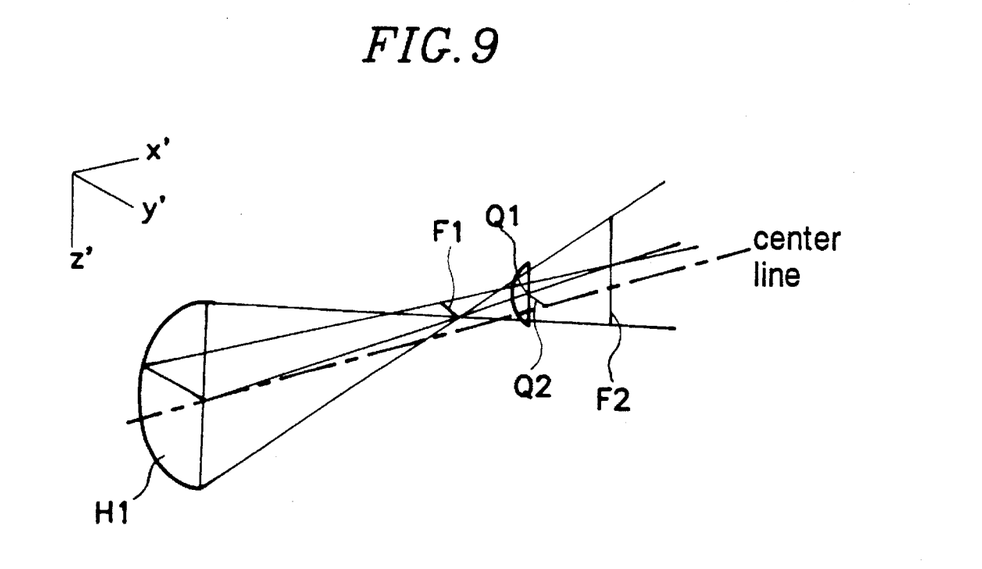
FIG. 9 is a view for illustrating the occurrence of astigmatism by means of the hologram in the optical pickup system according to the present invention.

FIG. 8 is a construction view showing the hologram module for forming the optical pickup system according to the present invention, and FIG. 9 is a view for illustrating the astigmatism by means of the hologram.

The bisectional hologram device 78 is formed of two semicircular holograms H1 and H2, and the position of reference light of two holograms H1 and H2 is an emitting point of the semiconductor laser 77. The position of object light of the holograms H1 and H2 is set to respective focusing points F1 and F2 in the y and z directions as shown in FIG. 9. Thus, the beam by the hologram H1 is focusing onto a point Q1 where a circular beam is formed between the focusing points F1 and F2, and the beam by the hologram H2 is focusing onto a point Q2.

Figure 10:
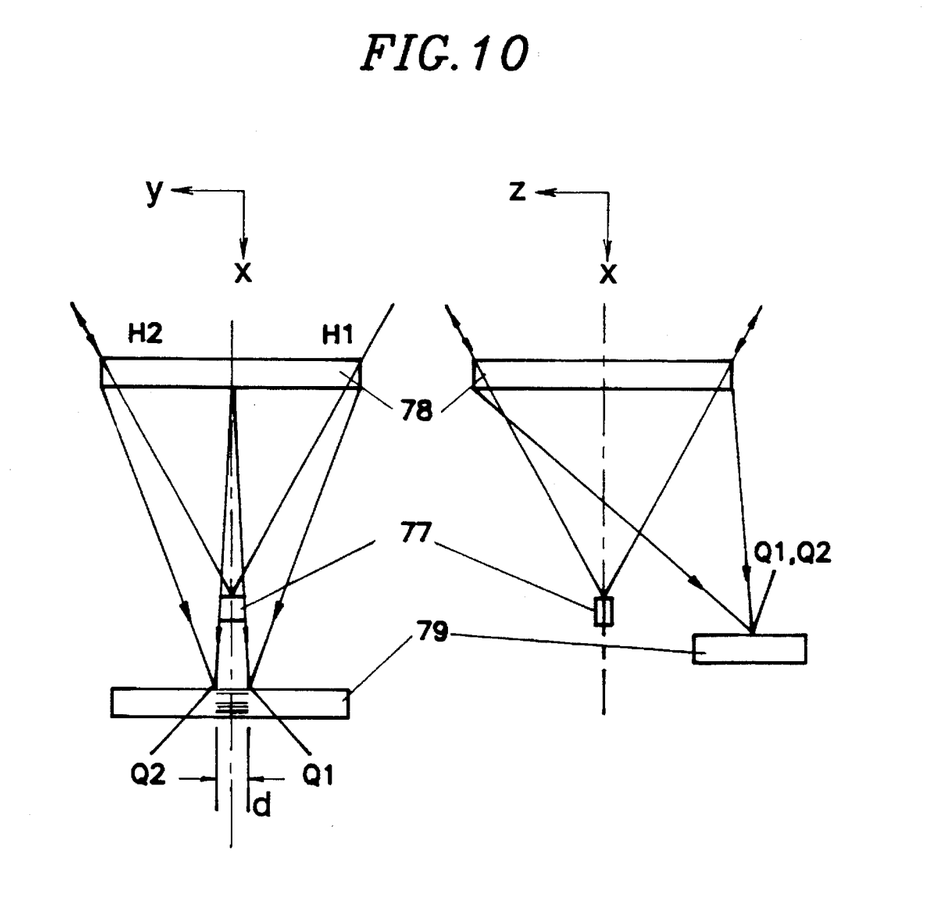
FIG. 10 is a view for illustrating the diffraction of the laser beam by the hologram in the optical pickup system according to the present invention.
Figures 11A, 11B, 11C:
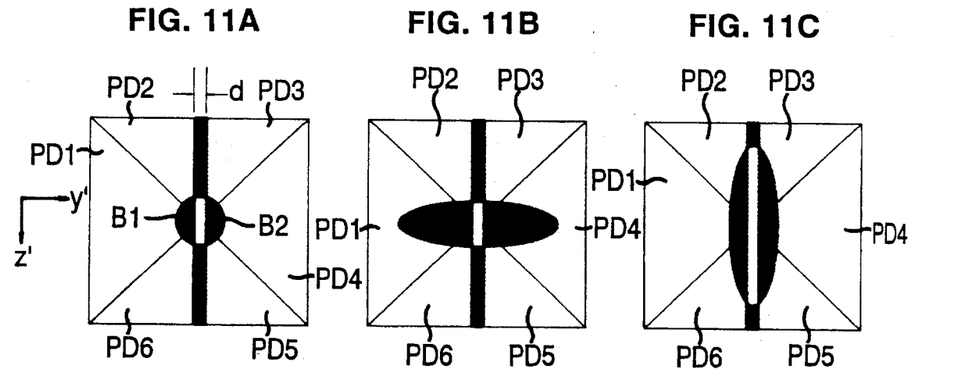

Therefore, if the photodetector 79 divided-by-six as shown in FIG. 11 is disposed at the points Q1 and Q2 for forming the beams between the focusing points F1 and F2, the beams are focusing onto the photodetector 79 divided-by-six by the holograms H1 and H2 of the bisectional hologram device 78 as shown in FIG. 10. At this time, as shown in FIGS. 8 to 10, the beams focusing onto the photodetector 79 divided-by-six by the holograms H1 and H2 are set to be apart from each other by as long as a distance d while being focused. As shown in FIG. 11, the distance d between the beams focused by the holograms H1 and H2 is set to be the same as a linewidth d of a partition line for isolating sections of PD1, PD2 and PD6 from sections PD3, PD4 and PD5 of the photodetector 79 divided-by-six.

As illustrated in FIG. 11, the photodetector 79 divided-by-six is formed such that a square area is divided into four along the diagonal direction, and divided into two in the z direction, thereby providing six sections.

Two photodetectors are used in the optical pickup system according to the present invention, in which the photodetector 79 divided-by-six is employed to monitor the focus error and tracking error by means of the beams focusing onto the sections PD1 to PD6, and bisectional photodetector 83 is employed to monitor the existence of the information written on the disc 71 by means of the beams focusing onto the sections PD7 and PD8.

Hereinbelow, the operation of the optical pickup system according to the present invention having the above-described construction will be described in detail with reference to FIGS. 8 to 12.

Once the laser beam emitted from the semiconductor laser 77 passes through the bisectional hologram device 78, diffraction beams of zero, +1st and −1st are produced. Among these, only the diffraction beam of zero passes through the hologram device 78 to be incident to the collimator lens 76. The diffraction beam of zero incident to the collimator lens 76 is changed into the parallel beams to be incident to the polarizing beam splitter 75 which, in turn, transmits to permit 50% of the beam of P-wave component in the incident parallel beams to be incident to the reflection mirror 74. The reflection mirror 74 reflects the incident beam of P-wave component to change the advancing direction of the beam toward the disc 71. The beam reflected by the reflection mirror 74 is focusing onto the disc 71 by means of the objective lens 72.

The beam focusing onto the disc 71 is reflected by the disc 71 to be converted into the parallel beams via the objective lens 72. Here, the beam reflected by the disc 71 is the mixed beam having P-wave and S-wave. The parallel beams passed through the objective lens 72 is reflected by the reflection mirror 74 to be incident to the polarizing beam splitter 75.

If there is information on the disc 71, the parallel beams incident to the polarizing beam splitter 75 includes the S-wave component together with the P-wave component; otherwise, the parallel beam includes only the P-wave component without having the S-wave component.

Of the parallel beams incident to the polarizing beam splitter 75, 100% beam of the S-wave component is fully reflected through the polarizing beam splitter 75 to be incident to the Wallaston prism 81. Also, 50% beam of the P-wave component is transmitted to be incident to the collimator lens 76, and the other 50% beam thereof is reflected to be incident to the Wollaston prism 81.

Figure 12:
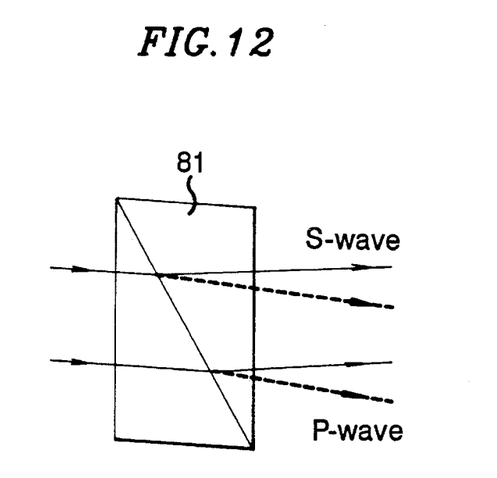
FIG. 12 is a view for illustrating the separation of the S-wave and P-wave by means of the general Wollaston prism in the optical pickup system according to the present invention.

The Wollaston prism 81 receives the mixed beam of 100% S-wave component and 50% P-wave component, and separates the incident mixed beam into the beams of P-wave component and S-wave component which maintain a certain angle from each other, as shown in FIG. 12. For the reason that the present invention does not detect the focus error by means of the mixed beam of (S+P)-wave, there is no need to separate the (P+S)-wave by using the modified Wollaston prism. Accordingly, the present invention utilizes the general Wollaston prism to separate just the S-wave and P-wave which maintain the certain angle from each other.

The beams separated by the Wollaston prism 81 are focusing onto the bisectional photodetector 83 by means of the focusing lens 82.

The information on the disc 71 is read out by the beam focusing onto the bisectional photodetector 83, which is detected by a signal difference of the two partitioned sections PD7 and PD8 of the bisectional photodetector 12 if the information written on the disc 71 is a magneto-optical signal (i.e., kerr rotation by a magnetization direction). This is expressed by the following equation (5):

Optical information signal (magneto-optical signal)

$$=S7-S8 \qquad (5)$$

where S7 and S8 denote the electrical signal in the sections PD7 and PD8 of the bisectional photodetector 83.

In case of the optical information signal (i.e., pit signal) of uneven shape written on the disc 71, the information signal is monitored by the variation of light quantity as defined in equation (6):

$$\text{Optical information signal (pit signal)} = S7+S8 \qquad (6)$$

Now, the operation of correcting the tracking error and focus error will be described.

In connection with the focus error correction, the beam of 50% P-wave component transmitted through the polarizing beam splitter 75 is focused and diffracted via the collimator lens 76 and hologram device 78 to be used for monitoring the focus error and tracking error. More specifically, the beam of P-wave component transmitted through the polarizing beam splitter 75 is focusing onto a light-emitting surface of the semiconductor laser 77. Then, when the focused beam is incident to the hologram device 78 placed between the semiconductor laser 77 and collimator lens 76, the beam incident to the hologram device 78 serves as the reference light of the holograms H1 and H2 of the hologram device 78.

Consequently, as shown in FIG. 9, the beams focusing onto the focusing points F1 and F2 in the y and z directions which are the positions of the object light of the holograms H1 and H2 are reproduced. Therefore, by installing the photodetector 79 divided-by-six onto the points Q1 and Q2 for forming the circular beam between the focusing points F1 and F2, the reproduced beam is monitored by the photodetector 79 as described with reference to FIGS. 8 to 10 to thereby generate a signal required for detecting the focus error and tracking error. In other words, once the beam is focusing onto the holograms H1 and H2 of the hologram device 78 by the collimator lens 76 as above, the focused beam is diffracted and focused onto the point Q1 in the −Y direction of the photodetector 79 divided-by-six by the hologram H1 and, simultaneously, diffracted and focused onto the point Q2 in the +Y direction of the photodetector 79 divided-by-six by the hologram H2.

The beam is focusing onto photodetector 79 divided-by-six by means of the holograms H1 and H2 as shown in FIG. 11. When there is no focus error, the beam is circularly formed on the photodetector 79 divided-by-six as shown in FIG. 11A, so that the light quantity incident to respective sections PD1, PD4, PD2 plus PD3, and PD5 plus PD6 is the same altogether. If the disc 71 becomes near to the objective lens 72, the beam is focusing into the z-direction to be elongated in the y-direction as shown in FIG. 11B. Thus, the light quantity incident to the section PD1 or PD4 is greater than that incident to the section PD2 plus PD3 or PD5 plus PD6. On the contrary, if the disc 71 becomes distant from the objective lens 72, the beam is focusing in the y-direction to be elongated in the z-direction as shown in FIG. 11C. Thus, the light quantity incident to the section PD2 plus PD3 or PD5 plus PD6 is greater than that incident to the section PD1 or PD4.

The focus error signal FES is obtained by the following equation (7):

$$FES=(S1+S4)-(S2+S3+S5+S6) \qquad (7)$$

where S1, S2, S3, S4, S5 and S6 denote respective signals in the sections PD1, PD2, PD3, PD4, PD5 and PD6 of the photodetector 79 divided-by-six.

When the focus error does not appear, the light quantity incident to the section PD1 or PD4 is the same as that incident to the section PD2 plus PD3 or PD5 plus PD6 as shown in FIG. 11A, so that the focus error signal FES becomes zero in the above equation (7). If the disc 71 is near to the objective lens 72, the light quantity incident to the section PD1 or PD4 of the photodetector 79 divided-by-six is greater than that incident to the section PD2 plus PD3 or PD5 plus PD6 as shown in FIG. 11B, so that the focus error signal FES is greater than zero. If the disc 71 is distant from the objective lens 72, the light quantity incident to the section PD2 plus PD3 or PD5 plus PD6 is greater than that incident to the section PD1 or PD4 as shown in FIG. 11C, so that the focus error signal FES is smaller than zero.

In case that the improper distance between the disc 71 and objective lens 72 results in the focus error as described above, the actuator 73 is utilized in accordance with the focus error signal FES to transfer the objective lens 72 up and down, thereby correcting the focus error.

In connection with the tracking error correction, the tracking error signal TES is obtained by the equation (8) as below:

$$TES=(S1+S2+S6)-(S3+S4+S5) \qquad (8)$$

The boundary line of the bisectional hologram device 78 is the same as the tangential line of a disc track. For this reason, if the beam focusing onto the disc 71 is slanted toward the inside the track (i.e., the central side of the disc), the hologram Hi placed inward the disc 71 receives the greater light than the hologram H2 placed outward the disc. As the result, the intensity of the beam applied to the section PD1+PD2+PD6 is stronger than that onto the section PD3+PD4+PD5. Accordingly, when the focusing beam is slanted inward the track, the tracking error signal TES is greater than zero in the above equation (8). Contrarily, when the beam focusing onto the disc 71 is slanted toward the outside the track, the intensity of the beam applied to the section PD1+PD2+PD6 is weaker than that onto the section PD3+PD4+PD5, so that the tracking error signal TES is smaller than zero. In conclusion, the tracking error is corrected by transferring the objective lens 72 left to right by means of the actuator 73.

As described above, the optical pickup system according to the present invention can correct tracking error and focus error while accurately reading out the information written on the disc.

In the optical pickup system according to the present invention, a bisectional hologram is adopted to monitor a signal in a single-beam system which utilizes astigmatism and a push-pull method, so that the focus and tracking error signals are accurately detected without requiring a three-beam diffraction grating heretofore used in the conventional optical pickup system, while enabling to accurately detect a magneto-optical signal or optical information (pit) signal written on a disc.

Furthermore, since the diffraction grating or concave lens is not employed to decrease the number of optical parts, and easily-manufactured polarizing beam splitter and Wollaston prism over those of the conventional parts are used to simplify the structure of the optical pickup system as well as lower the manufacturing cost thereof.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup system capable of reading out information from a disc or writing information on said disc comprising:

a semiconductor laser used as a light source;

a polarizing beam splitter for fully reflecting all S-polarized beam component, reflecting some of P-polarized beam component and transmitting the other P-polarized beam component with respect to a laser beam from said semiconductor laser, and fully reflecting all S-polarized beam component, reflecting some of P-polarized beam component and transmitting the other P-polarized beam component with respect to a beam reflected by said disc;

a collimator lens placed between said semiconductor laser and polarizing beam splitter for changing said laser beam from said semiconductor laser to be a parallel beam to allow said parallel beam to be incident to said polarizing beam splitter, and focusing the P-polarized beam component transmitted through said beam splitter after being reflected by said disc;

a reflection mirror placed between said polarizing beam splitter and disc for reflecting the beam transmitted through said polarizing beam splitter toward said disc; and reflecting the beam reflected by said disc toward said polarizing beam splitter;

an objective lens placed between said reflection mirror and disc for focusing the beam reflected by said reflection mirror onto said disc, and forming the beam reflected by said disc to a parallel beam to allow said parallel beam to be incident to said reflection mirror;

a photodetector divided-by-six for detecting a tracking error and a focus error in accordance with the intensity of beams respectively focusing onto six sections thereof;

a hologram device placed between said semiconductor laser and collimator lens for diffracting to allow said laser beam from said semiconductor laser to be incident to said collimator lens, and diffracting to focus beams from said P-polarized beam component transmitted through said polarizing beam splitter onto said photodetector divided-by-six;

a bisectional photodetector for detecting said information written on said disc in accordance with the intensity of beams respectively focusing onto two sections thereof;

a Wollaston prism placed between said polarizing beam splitter and bisectional photodetector for separating beams of P-wave component and S-wave component from a mixed beam having P-wave and S-wave components from said polarizing beam splitter; and a focusing lens for focusing the P-wave and S-wave component beams separated by means of said Wollaston prism onto two sections of said bisectional photodetector.

2. An optical pickup system as claimed in claim 1, further comprising an actuator for transferring said objective lens up-and-down or left-to-right direction in order to correct a focus error or tracking error.

3. An optical pickup system as claimed in claim 1, wherein an active layer of said semiconductor layer is formed to be parallel with the x-y plane to force a polarized beam to be said P-polarized beam when said beam from said semiconductor laser is incident to said polarizing beam splitter, provided that the disc plane is defined as x-y plane and the vertical direction with respect to the upper surface of said disc is defined as z-axis.

4. An optical pickup system as claimed in claim 1, wherein said beams of P-wave and S-wave components from said Wollaston prism are separated while maintaining a predetermined angle from each other.

5. An optical pickup system as claimed in claim 1, wherein said hologram device is formed of two semicircular holograms.

6. An optical pickup system as claimed in claim 5, wherein the position of reference light of said two holograms is the light-emitting point of said semiconductor laser, and the position of object light is the focusing points in the y-and z-directions when the disc plane is defined as x-y plane and the vertical direction with respect to the upper surface of said disc is defined as z-axis.

7. An optical pickup system as claimed in claim 6, wherein the focused beam by said two holograms are focused circularly between said focusing points in the y- and z-directions.

8. An optical pickup system as claimed in claim 7, wherein the beams focused by two holograms are focused by maintaining a predetermined distance onto said photodetector divided-by-six.

9. An optical pickup system as claimed in claim 8, wherein said photodetector divided-by-six is placed where the beams are focused circularly by two holograms between two focusing points.

10. An optical pickup system as claimed in claim 9, wherein said photodetector divided-by-six is shaped as a square which is divided into four in the two diagonal directions and further divided into two along the z-axis centering an intersection point of the diagonal lines to thereby be divided into six sections.

11. An optical pickup system as claimed in claim 10, wherein the two sections along the z-axis of said photodetector divided-by-six is divided by being apart from the central point as long as a distance corresponding to half of the distance between the beams focused by said two holograms.

\* \* \* \* \*